United States Patent
Cartrette et al.

(10) Patent No.: US 11,231,166 B2
(45) Date of Patent: *Jan. 25, 2022

(54) METHODS AND DEVICES FOR AUTO-CALIBRATING LIGHT DIMMERS

(71) Applicant: The Watt Stopper, Inc., Carlsbad, CA (US)

(72) Inventors: Jonathan P. Cartrette, Carlsbad, CA (US); Peter J. Horton, Carlsbad, CA (US)

(73) Assignee: The Watt Stopper, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/004,650

(22) Filed: Aug. 27, 2020

(65) Prior Publication Data

US 2020/0396814 A1 Dec. 17, 2020

Related U.S. Application Data

(63) Continuation of application No. 16/677,525, filed on Nov. 7, 2019, now Pat. No. 10,764,983, which is a
(Continued)

(51) Int. Cl.
| | |
|---|---|
| *H05B 45/10* | (2020.01) |
| *F21V 23/00* | (2015.01) |
| *H05B 47/11* | (2020.01) |
| *H05B 47/14* | (2020.01) |
| *H05B 47/165* | (2020.01) |
| *F21S 2/00* | (2016.01) |
| *F21V 23/04* | (2006.01) |
| *F21Y 115/10* | (2016.01) |
| *F21Y 115/15* | (2016.01) |

(52) U.S. Cl.
CPC .......... *F21V 23/003* (2013.01); *H05B 45/10* (2020.01); *H05B 47/11* (2020.01); *H05B 47/14* (2020.01); *H05B 47/165* (2020.01); *F21S 2/00* (2013.01); *F21V 23/04* (2013.01); *F21Y 2115/10* (2016.08); *F21Y 2115/15* (2016.08)

(58) Field of Classification Search
CPC ...... H05B 47/11; H05B 47/19; H05B 47/105; H05B 47/175; H05B 47/185; H05B 47/195; H05B 45/10; H05B 45/30; H05B 45/327

See application file for complete search history.

(56) References Cited

U.S. PATENT DOCUMENTS 10,236,789 B2 * 3/2019 Steiner ................ H05B 47/115
2012/0262080 A1 * 10/2012 Watanabe .......... H05B 45/3725
315/210

(Continued)

*Primary Examiner* — Tung X Le

(74) *Attorney, Agent, or Firm* — Crockett & Crockett, PC; K. David Crockett, Esq.; Niky Economy Syrengelas, Esq.

(57) ABSTRACT

An automated dimming load controller automatically measures the relationship between the current draw and the dimmer setting for each light or group of lights connected to the load controller. Once measured, the relationship between the current draw and the dimmer setting can be used to enable the dimmer controller to adjust the lights between their minimum and maximum effective illumination. This automatic setting of the dimmer controller may be performed regularly to accommodate changes in performance or replacement of any of the connected lights, drivers or ballasts.

4 Claims, 4 Drawing Sheets

Related U.S. Application Data continuation of application No. 16/273,726, filed on Feb. 12, 2019, now Pat. No. 10,477,648, which is a continuation of application No. 15/664,907, filed on Jul. 31, 2017, now Pat. No. 10,206,266, which is a continuation of application No. 14/882,907, filed on Oct. 14, 2015, now Pat. No. 9,723,691.

(56) References Cited

U.S. PATENT DOCUMENTS

| | | | | |
|---|---|---|---|---|
| 2012/0271477 | A1* | 10/2012 | Okubo | H04L 12/10 |
| | | | | 700/297 |
| 2013/0043792 | A1* | 2/2013 | Reed | H05B 45/50 |
| | | | | 315/126 |

* cited by examiner

METHODS AND DEVICES FOR AUTO-CALIBRATING LIGHT DIMMERS

This application is a continuation of U.S. application Ser. No. 16/677,525, filed Nov. 7, 2019, which is a continuation of U.S. application Ser. No. 16/273,726, filed Feb. 12, 2019, which is a continuation of U.S. application Ser. No. 15/664,907, filed Jul. 31, 2017, now U.S. Pat. No. 10,206,266, which is a continuation of U.S. application Ser. No. 14/882,907 filed Oct. 14, 2015, now U.S. Pat. No. 9,723,691.

FIELD OF THE INVENTIONS

The inventions described below relate to the field of electrical power controllers for dimming electrical lights.

BACKGROUND OF THE INVENTIONS

Low voltage light drivers and ballasts do not have identical relationships between an applied dimming signal and the power drawn by the combination of the driver/ballast and the connected lights. Consequently, replacing a driver/ballast with a comparable part will result in different dimming performance making it time consuming to replace a driver/ballast and reconfigure the system to obtain optimal dimmer performance.

This situation is complicated by the fact that low voltage light drivers and ballasts have different non-linear relationships between the applied dimming signal and the power drawn by the combination of the driver/ballast and the connected lights. In some cases the low end of the driver's dimming range may be at about 1 VDC output of the 0-10V output range from a dimmer controller. Similarly, the high end of the driver's dimming range may be at about 8.6VDC of the 0-10V output range of the dimmer controller. In this example, the dimming range between 0 and 1 VDC and from 8.6 VDC and 10 VDC is known as dead travel.

Determination of ballast or driver performance to guarantee the 1-100% dimmer position values match with the maximum and minimum power output of a particular driver/ballast are typically accomplished by eye or via a light meter. The operation is inaccurate and must be performed manually. This is time consuming for an installer. This performance matching is also limited to the ballast/driver and the lights it is combined with. All ballasts and drivers are not identical and after installation, replacement of a light will destroy any correspondence between the light performance and the dimmer control setting.

SUMMARY

The devices and methods described below provide for an automatic measurement of the voltage and current relationships (power) for each light or group of lights connected to the dimmer controller and automatic calibration of the dimmer controller to minimize dead travel at the low end, the high end or both ends of the dimmer settings. Once measured, the relationship between the power draw and the dimmer setting can be used to enable the dimmer controller to adjust the lights between their minimum and maximum effective power draw. The automatic calibration of the dimmer controller may be performed regularly to accommodate changes in performance or replacement of any of the connected lights, drivers or ballasts.

Lighting ballasts for fluorescent lamps and solid-state light drivers each provide a datasheet that indicates the curve of the wattage/dimmer percent output relationship and often also the wattage/lumen output relationship. Specifically, at a given lumen output level as a percentage of maximum, the ballast or driver will draw power that is proportionally similar; i.e. at 50% dimming level the ballast or driver will generally draw 50% of maximum power. A programmable dimmer controller with an integrated light power measurement module as described below runs a self-calibration to characterize the ballast/driver system in conjunction with its particular light or lights and determine the relationship of the wattage/dimmed output percentage relationship automatically or on demand; either of which being more accurate and more time efficient than the current process. The self-calibration algorithm may be performed over time to continue to adapt the dimmer controller's performance to any degradation that may occur to the connected ballasts or drivers over time.

A programmable dimmer controller is provided with a built-in power measurement module that measures power delivered to the light and measures and sets a programmable high and low trim value to establish the effective dimming range. An algorithm within the software or firmware of the programmable dimmer controller performs the self-calibration by applying changing power to the dimming outputs while recording the changes in energy usage thus establishing the relationship between current delivered to the light and the dimmed output as a percentage of total.

The automated dimmer controller described below includes a dimmer controller, a current measurement module for measuring current applied to dimmable lights, a microprocessor operably connected between the dimmer controller and the current measurement module, a memory operably connected to the microprocessor and an algorithm stored in the memory to enable the microprocessor to calibrate the dimmer controller.

The method of automatically calibrating a dimmer controller connected to one or more lights described below includes the steps of automatically exercising one or more lights by varying the dimmer controller and measuring current drawn by the one or more lights, recording a dimmer minimum setting and a current minimum value as the low trim settings, a dimmer maximum setting and a current maximum value as the high trim settings and using the dimmer minimum setting, the current minimum value, the dimmer maximum setting and the current maximum value to control the one or more lights. The determination of the high trim settings and the low trim settings may be performed in any suitable order and the determination of either the high or low trim settings may be optional.

The method of automatically calibrating the dimmer controller as described below includes the steps of selecting one or more lights to be exercised by the application of varying voltage and measuring current drawn by the one or more lights and setting the dimmer setting to 0% for the selected lights. Measuring the current drawn by the selected lights, recording the current drawn as a ballast current minimum, increasing the dimmer setting by a selected amount, measuring the current drawn by the selected lights and determining if the measured current is greater than the ballast current minimum. If the measured current is within a tolerance value of the ballast current minimum, recording the dimmer setting as a dimmer minimum and then returning to the step of increasing the dimmer setting by a selected amount. If the measured current increases beyond the tolerance value of the current, recording the dimmer minimum as the final dimmer minimum and the current minimum as the final current minimum. The final dimmer minimum and the final current minimum correspond to the low trim values for the dimmer controller. The high trim values are determined by recording the measured current as a ballast current maximum and the dimmer setting as ballast dimmer maximum and increasing the dimmer setting by the selected amount, measuring the current drawn by the selected lights and determining if the measured current is greater than the ballast current maximum. If the measured current increases beyond a tolerance value of the ballast current maximum, recording the dimmer setting as a ballast dimmer maximum and the measured current as the ballast current maximum and then returning to the step of increasing the dimmer setting by the selected amount. If the measured current is within the tolerance value of the current maximum, recording the ballast dimmer maximum as the final dimmer maximum and the ballast current maximum as the final current maximum. The final dimmer maximum and the final current maximum represent the high trim values for the dimmer controller. The dimming of the selected lights is accomplished by the dimmer controller using the final dimmer minimum, the final current minimum, the final dimmer maximum and the final current maximum values (the high and low trim values).

DETAILED DESCRIPTION OF THE INVENTIONS

Figure 1:
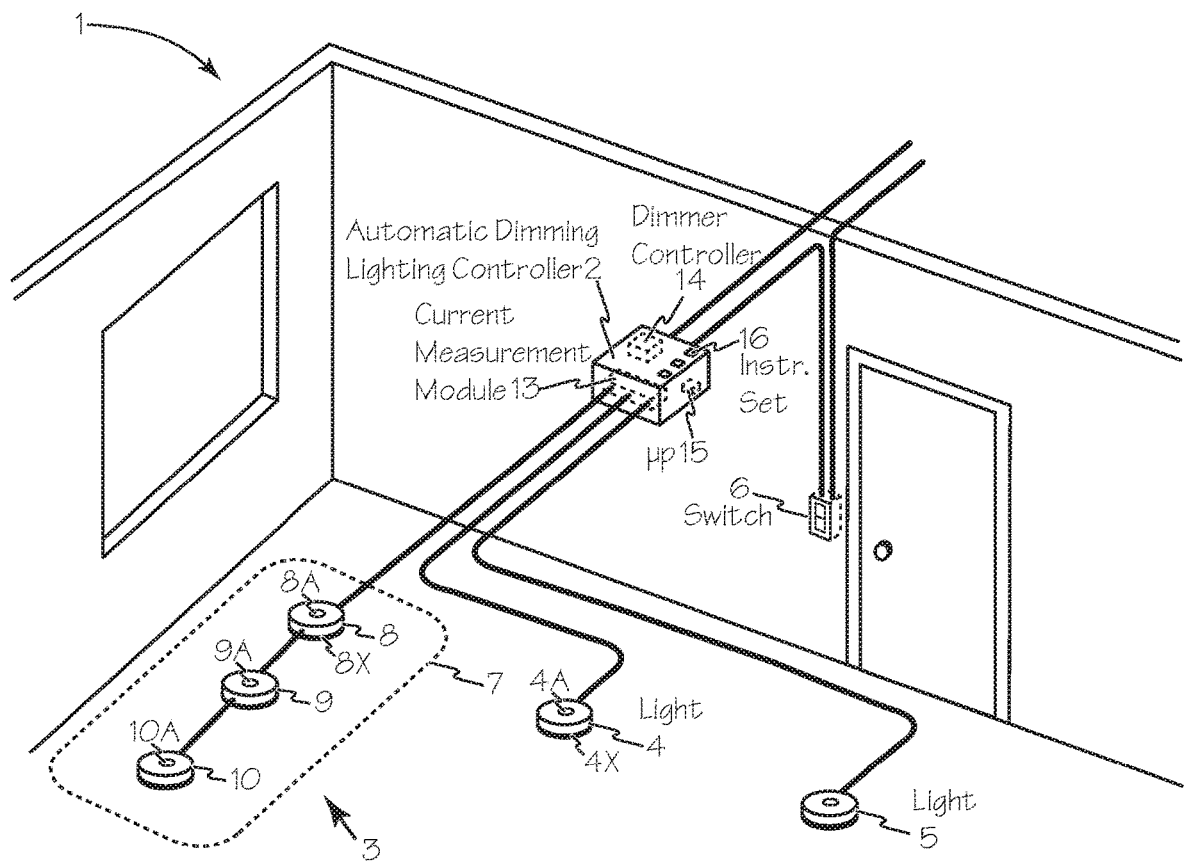
FIG. 1 is a perspective view of a space equipped with an automated dimming load controller and a variety of lights.

FIG. 1 illustrates space 1 equipped with an automated dimmable lighting controller 2 and a variety of lights, sensors and controls such as switch 6. Lights such as first light 3, second light 4 and third light 5 may be individual lights such as second light 4 or third light 5, or they may be multiple individual lights commonly controlled as a zone or other suitable combination of lights such as first light 3 which is zone 7 comprising individual lights 8, 9 and 10.

Figure 2:
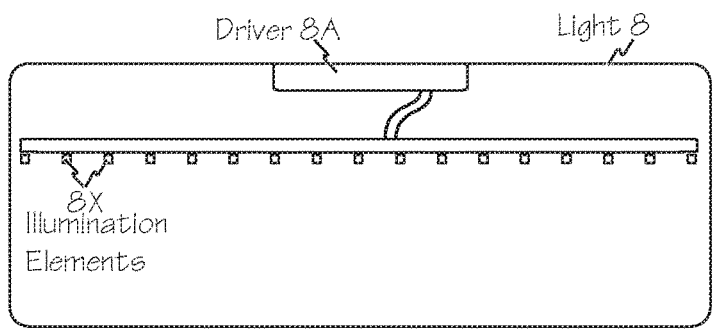
FIG. 2 is a cross section of a light.

Each light, such as lights 4, 5, 8, 9 and 10, is a combination of a light driver or ballast combined with one or more illumination elements as illustrated in FIG. 2. For example, light 8 includes driver 8A operatively connected to one or more illumination elements such as illumination elements 8X and light 4 includes ballast 4A and illumination elements 4X. Lighting controller 2 includes current measurement module 13, dimmer controller 14, microprocessor 15 and one or more instruction sets operatively available to microprocessor 15 such as instruction set 16. Instructions such as instruction set 16 may be available in software or firmware.

Ballasts/drivers 8A, 9A and 10A for lights 8, 9 and 10 respectively, do not provide output current from 0-100% corresponding linearly to the dimming voltage applied. Consequently, a dimmer controller set to provide 100 percent illumination at 10V may be providing 100 percent illumination at 8 or 9 volts. There may also be a similar dead travel zone at the low end of the dimming control range. To bring correspondence between the dimming control input and the performance of the light ballast or driver, lighting controller 2 performs dimming accuracy calibration according to algorithm 20 of FIG. 3. The instructions for algorithm 20 are included in instruction set 16 which runs on microprocessor 15. Algorithm 20 generates a final ballast (or driver) minimum value and a final ballast (or driver) maximum value. The final ballast (or driver) minimum value corresponds to the low trim value for the dimmer controller. The final ballast (or driver) maximum value corresponds to the high trim value for the dimmer controller. The final ballast minimum value and maximum value will be used by the calibrated dimmer controller to accurately control the adjusted lights for lighting control strategies such as maximum output reduction or demand response light shedding.

Figure 3:
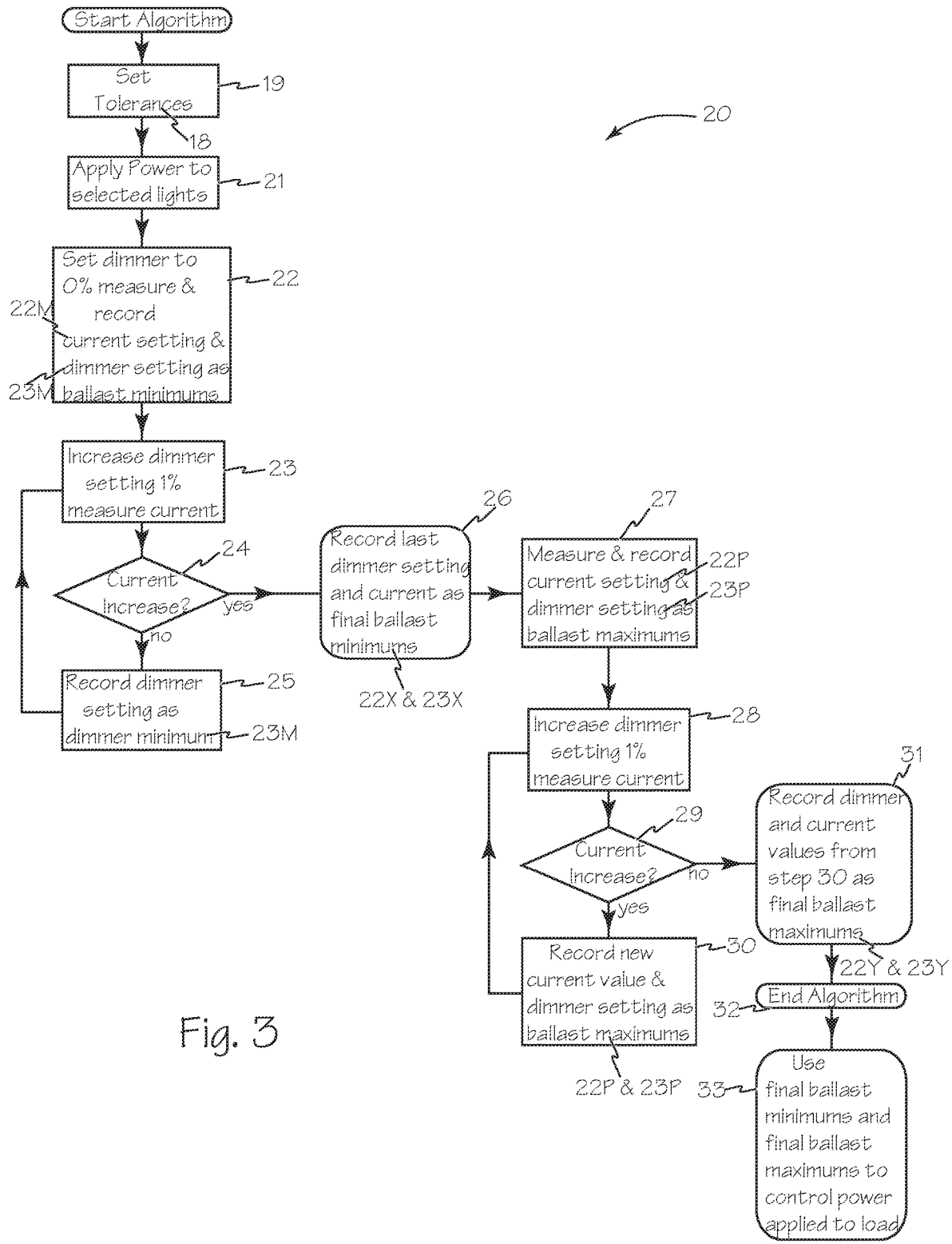
FIG. 3 is the control algorithm for the automated dimming load controller of FIG. 1 to measure and set the minimum and maximum limits for the light drivers or ballasts.

Algorithm 20 of FIG. 3 begins with lighting controller 2 isolating each individual light or zone of lights to be exercised depending on the light configuration and optional step 19 to set current tolerances for the measured current. Referring to FIGS. 1 and 3, in step 21 lighting controller 2 through dimmer control 14 applies power to one or more lights to be exercised such as second light 4 or a zone having multiple lights such as zone 7 with lights 8, 9 and 10. In step 22 lighting controller 2 sets dimmer control 14 for the selected light to 0% and current measurement module 13 measures and records the current applied to the light or group of lights as ballast minimum current 22M. In step 23, lighting controller 2 sets dimmer control 14 to increase dimming setting 23M 1% or other appropriate interval, and current measurement module 13 measures the current applied to the light. In step 24 microprocessor 15 compares the previously recorded ballast minimum current 22M against the current measured in step 23. If the current measured in step 23 is the same as recorded ballast minimum current 22M, dimmer setting 23M is recorded as ballast dimmer minimum at step 25 and the algorithm returns to step 23.

The determination of equivalence may be accomplished with any suitable tolerance level such as equality tolerance setting or settings such as setting 18 of optional step 19. A suitable tolerance may be selected to be between 1% and 10% of the last measured value and +/−5% of the measured value may be a default tolerance setting. Measured current values within +/− tolerance setting 18 of the current minimum are considered the same or equivalent. If the current measured in step 23 is greater than recorded ballast minimum current 22M, at step 26 ballast minimum current 22M and dimmer setting 23M are recorded as final current and dimmer minimums 22X and 23X respectively. (A current measurement is greater than the ballast minimum current if it exceeds the value of the ballast minimum current 22M plus tolerance setting 18.)

The following steps measure and record the final current maximum 22Y and final dimmer maximum 23Y which correspond to the high trim values for the light and driver combination tested. At step 27 current measurement module measures current to the light and it is recorded as temporary current maximum 22P and the dimmer setting is recorded as temporary dimmer maximum 23P. In step 28 lighting controller 2 raises dimmer control 14 for the selected light 1% and current measurement module 13 measures the current applied to the light or group of lights. In step 29 microprocessor 15 compares the previously temporary current maximum 22P against the current measured in step 28. If the current measured in step 28 is greater than recorded temporary current maximum 22P, the dimmer setting from step 28 and the current measured in step 28 are recorded in step 30 as temporary current maximum 22P and temporary dimmer maximum 23P respectively and the algorithm returns to step 28. If the current measured in step 28 is the same as recorded temporary current maximum 22P, the temporary current maximum 22P and temporary dimmer maximum 23P from step 30 are recorded in step 31 as final current maximum 22Y and final dimmer maximum 23Y and the algorithm is complete.

Once measured and recorded, lighting controller 2 is calibrated to use final current minimum 22X, final dimmer minimum 23X, final current maximum 22Y and final dimmer maximum 23Y to enable dimming control of the power applied to the lights from 0% dimming to 100% dimming. The controller calibration performed by the algorithm of FIG. 3 may be performed with any suitable frequency and at any suitable time of day.

Steps 21 through 26 of algorithm 20 measure and record the final current minimum 22X and final dimmer minimum 23X which correspond to the low trim values for the light and driver combination tested. Steps 27 through 31 of algorithm 20 measure and record the final current maximum 22Y and final dimmer maximum 23Y which correspond to the high trim values for the light and driver combination tested. An alternate algorithm similar to algorithm 20 may be operated to determine the high trim values first and then the low trim values. Alternatively, only the low trim values may be determined and used or only the high trim values may be determined and used. The determination of the high and low trim values may also be performed from a 100% dimmer setting and lowering the dimmer setting at the appropriate steps, or starting at the 50% dimmer setting and moving up and down through the dimmer range to determine the high and low trim values.

Figure 4:
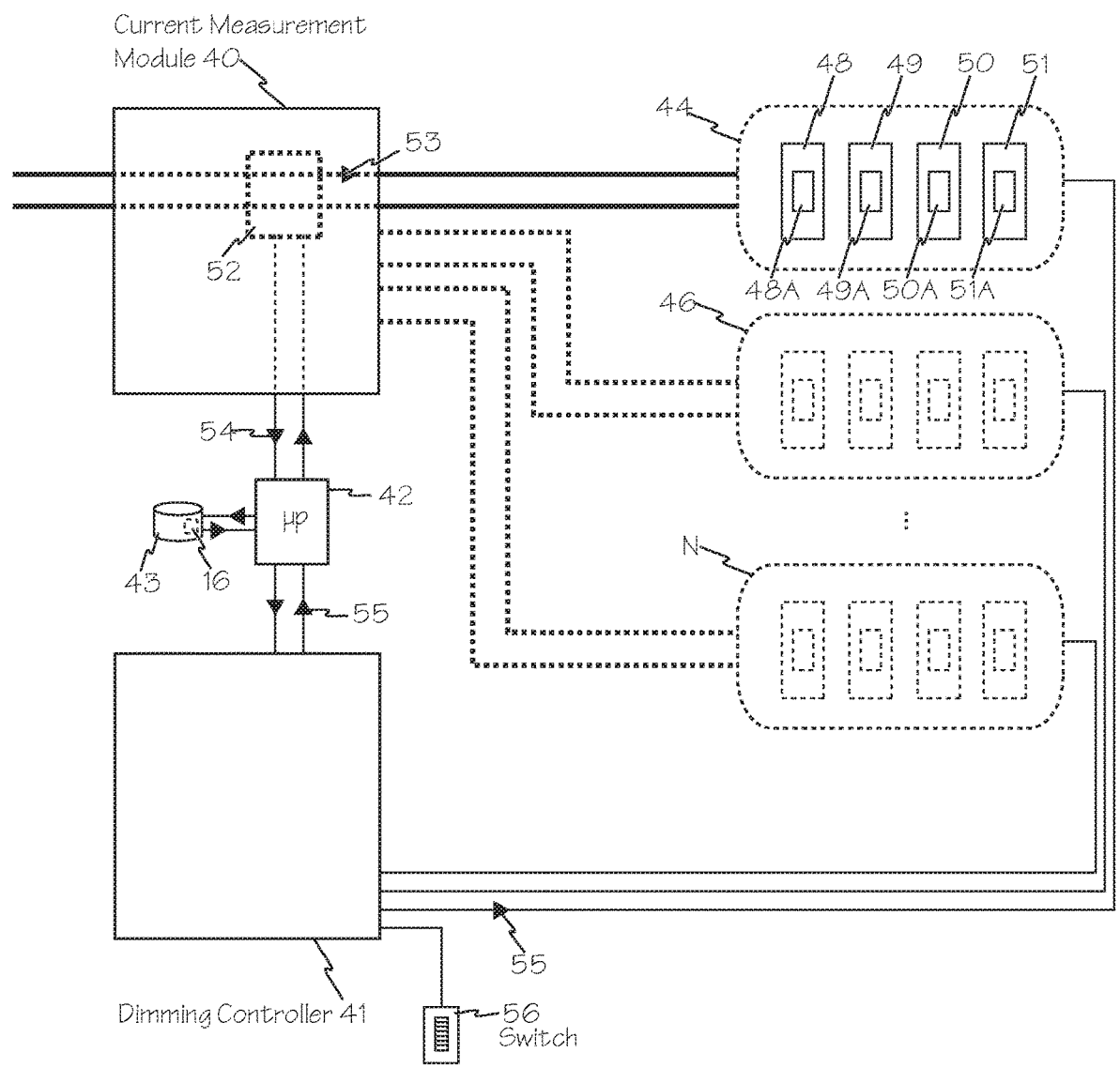
FIG. 4 is a block diagram of a current measurement module connected to a dimmer controller, a microprocessor and a variety of lights.

The block diagram of FIG. 4 illustrates a current measurement module 40 connected to a dimmer controller 41 through microprocessor 42 which is operably connected to memory 43. Current measurement module 40 is operably connected to a variety of lights such as the lights in zones 44 and zones 46 through N. Each of the dimmable lights in a lighting zone such as zone 44 is an individual light such as dimmable lights 48, 49, 50 and 51. Each of lights 48, 49, 50 and 51 has a removable ballast or driver such as drivers 48A, 49A, 50A and 51A respectively. Current measurement module 40 includes any suitable current measuring circuit or element such as current transducer 52 or a current shunt circuit. The measurement of the current 53 measured by current transducer 52 is communicated to microprocessor 42 as current data 54. Dimmer controller 41 transmits dimming settings such as dimming setting 55 to the lights in the controlled zone and to microprocessor 42. Dimming setting 55 controls the dimming status of individual lights and the lights in lighting zones such as lights 48, 49, 50 and 51 of lighting zone 44 as instructed by a suitable control such as switch 56 and or microprocessor 42.

In use, microprocessor 42 performs a calibration of dimmer controller 41 and the individual connected lights or zone of lights such as zones 44 and 46 through N. The calibration process is illustrated in algorithm 20 of FIG. 3.

Figure 5:
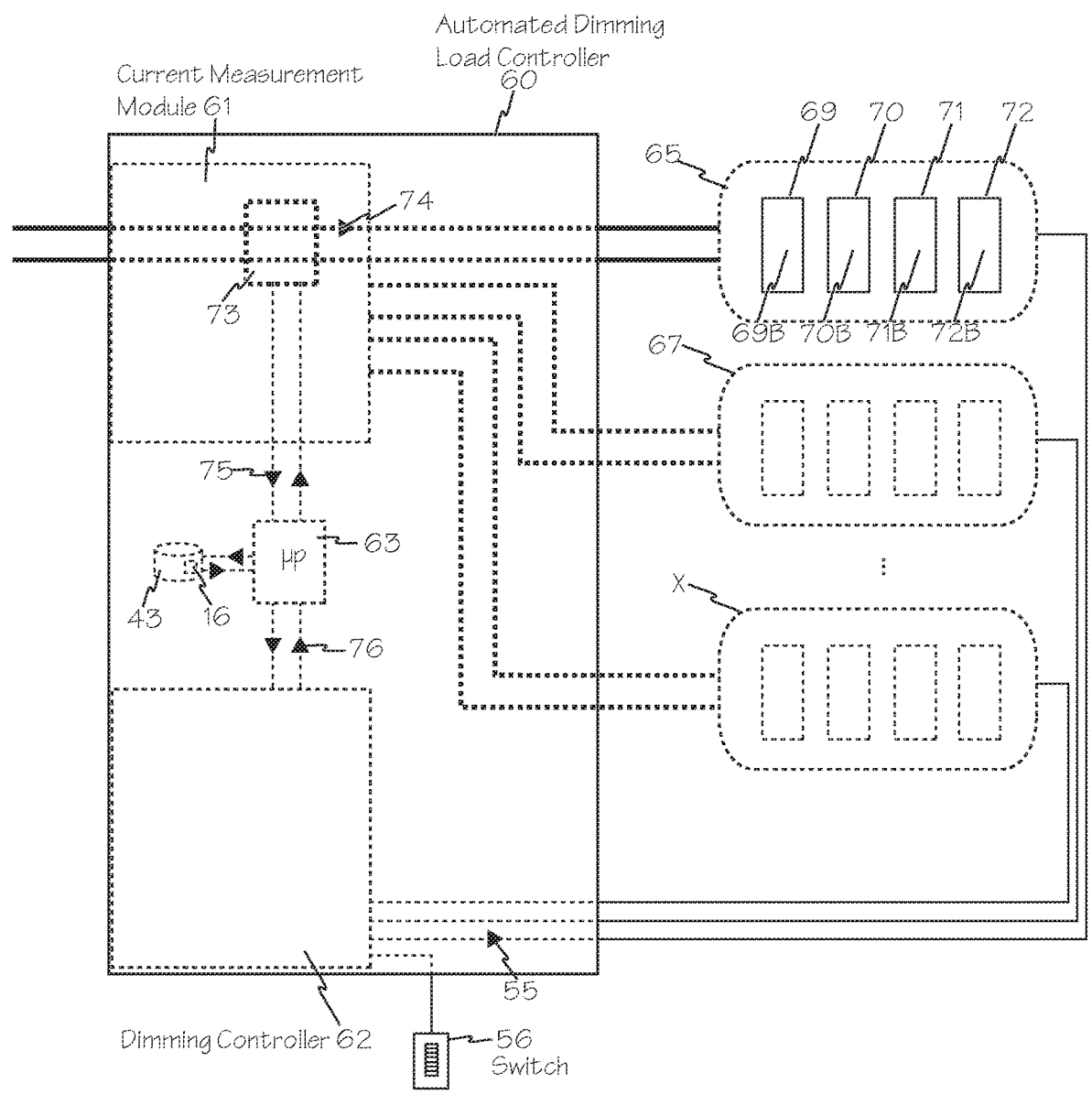
FIG. 5 is a block diagram of a dimming load controller with an integrated current measurement module and a microprocessor controlling a variety of lights.

The block diagram of FIG. 5 illustrates an automated dimming load controller 60 which includes current measurement module 61 connected to a dimmer controller 62 through microprocessor 63 which is operably connected to memory 64. Current measurement module 61 is operably connected to a variety of lights such as the lights in zones 65 and zones 67 through X. Each of the dimmable lights in a lighting zone such as zone 65 is an individual light such as dimmable lights 69, 70, 71 and 72. Each of lights 69, 70, 71 and 72 has a removable ballast such as ballasts 69B, 70B, 71B and 72B respectively. Current measurement module 61 includes any suitable current measuring circuit or element such as a current transducer or current shunt circuit 73. The measurement of the current 74 measured by current shunt circuit 73 is applied to microprocessor 63 as current data 75. Dimmer controller 62 transmits dimming settings such as dimming setting 76 to the lights in the controlled zone and to microprocessor 63. Dimming setting 76 controls the dimming status of individual lights and the lights in lighting zones such as lights 69, 70, 71 and 72 of lighting zone 65 as instructed by control 77 and or microprocessor 63.

In use, microprocessor 63 performs a calibration of dimmer controller 62 under instruction and control from individual connected lights or zone of lights such as zones 65 and 67 through X. The calibration process is illustrated in algorithm 20 of FIG. 3.

Current measurement modules include inductive current measurement, shunt current measurement or any other suitable method or device for measuring current delivered to a light or a group of lights. The voltage applied to a light or group of lights generally corresponds to the dimming setting of the controller.

The preferred embodiments of the devices and methods described with relation to lights. For the purposes of this disclosure, "lights" can be any suitable light emitting element such as LEDs, OLEDs, or other solid state implementation as well as incandescent, fluorescent, compact fluorescent, high-intensity discharge (HID), halogen, krypton or xenon. Any other suitable loads may also be used.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

We claim:

1. A lighting system, comprising:
   a lighting controller comprising:
   a dimmer controller having a dimmer setting;
   a current measurement module for measuring current applied to dimmable lights;
   a microprocessor operably connected between the dimmer controller and the current measurement module;
   a memory operably connected to the microprocessor; and
   an algorithm stored in the memory to enable the microprocessor to calibrate the dimmer controller;
   one or more dimmable lights operably connected to the dimmer controller; and
   a lighting driver interposed between each of the one or more dimmable lights and the dimmer controller.

2. The lighting system of claim 1, further comprising: a user controllable switch operably connected to the dimmer controller.

3. The lighting system of claim 1, where in the current measurement module includes a current transducer.

4. The lighting system of claim 1, where in the current measurement module includes a current shunt circuit.

* * * * *